April 8, 1941.  J. V. DYER  2,237,595
FASTENING STRIP CONTAINING NUTS
Filed June 4, 1940
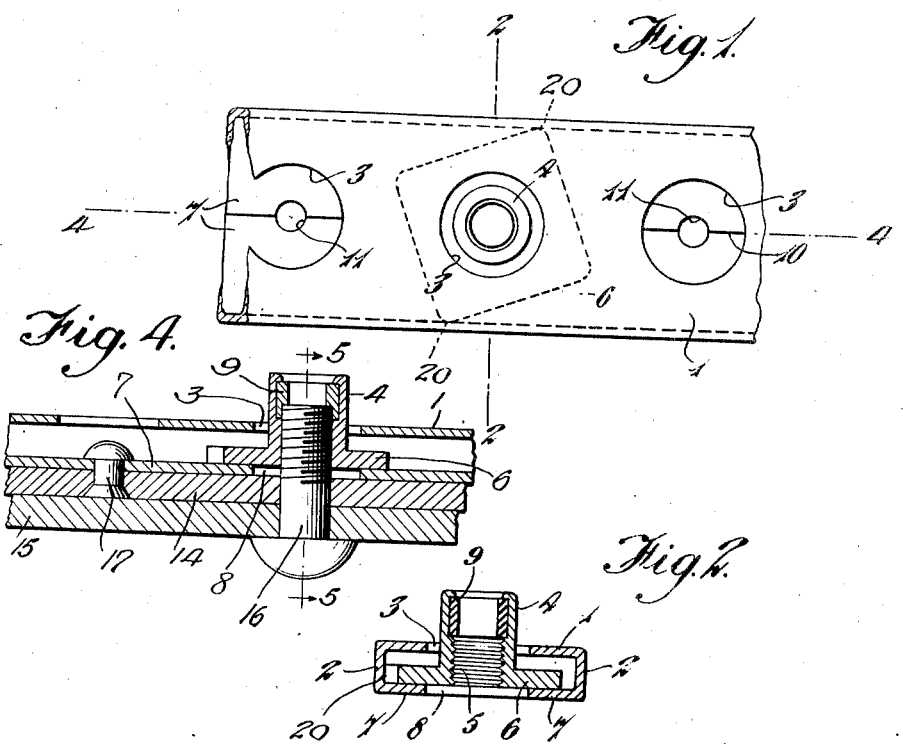
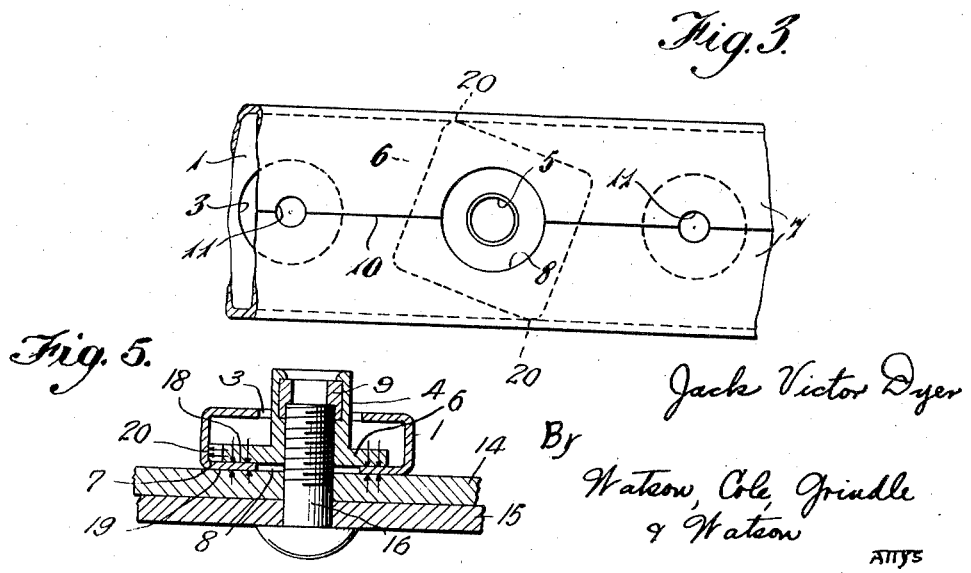
Jack Victor Dyer
By Watson, Cole, Grindle & Watson
ATTYS Patented Apr. 8, 1941

2,237,595

UNITED STATES PATENT OFFICE 2,237,595

FASTENING STRIP CONTAINING NUTS

Jack Victor Dyer, Crewkerne, England, assignor to Simmonds Development Corporation Limited, London, England Application June 4, 1940, Serial No. 338,818
In Great Britain June 29, 1939

4 Claims. (Cl. 85—32)

This invention relates to nut-containing fastening strips which are adapted to be secured to the rear or blind side of a structural part so that, after a part to be secured thereto has been placed in assembled position, the two parts may be removably secured together by co-operating bolts or like screw-threaded members which are passed through the structural parts and screwed into the nuts which are retained in position to receive them by the fastening strip.

My nut-containing fastening strip comprises a strip of metal or other suitable material providing a channel and one or more nuts secured to said channel member against removal and relative rotary movement, wherein each nut extends into an aperture in the web of the channel member and has a laterally-extending base portion housed within said channel, and the nut or nuts is or are secured to the channel member against removal by inwardly turned edge portions of the side flanges of the channel member forming a base to the fastening strip, the said base having an aperture registering with the bore of each nut.

Preferably each nut has a limited lateral movement relatively to the channel member, the aperture or apertures in the base of the strip registering with the bore of each nut for any position of the nut allowed by the limited lateral movement thereof. The part of each nut above the laterally-extending base portion thereof may be of cylindrical contour, the said base portion being adapted to engage the side flanges of the channel member to prevent relative rotary movement between the nut and channel member. The said base portion may be in the form of one or more lugs but is preferably in the form of a flange having at least one flat.

The invention has particular reference to a fastening strip containing a plurality of suitably spaced and aligned nuts, and one form of such a fastening strip is illustrated in the accompanying drawing, in which Figure 1 is a partial top plan view;

Figure 2 is a transverse sectional view taken on the line 2—2 of Figure 1;

Figure 3 is a partial bottom plan view;

Figure 4 is a longitudinal section taken substantially on the line 4—4 of Figure 1 and illustrating the application of the device to the fastening of structural members; and Figure 5 is a transverse sectional view on the line 5—5 of Figure 4, illustrating the application of the device and indicating the direction of certain forces exerted while a bolt is being threaded into a nut.

Referring to the drawing, the fastening strip comprises a channel member having a web portion 1 and side flanges 2, suitably spaced circular holes 3 being provided in the web portion 1. Each nut 4, of which only one is shown in the drawing, is provided with a screw-threaded bore 5 and the base thereof has a laterally-extending portion in the form of a square flange 6. The base portion of each nut is housed within the channel member with the part of the nut above the flange, which is of cylindrical contour, extending through a hole 3 in the web 1. The nuts 4 are secured to the fastening strip against removal by inwardly turned edge portions 7 of the side flanges 2, such edge portions being of such length that they meet at 10 on the centre line of the base of the fastening strip. The base of the strip thus formed by the edge portions 7 is provided with apertures 8 suitably positioned to register with the bore of each nut. As shown in the drawing, the width of the flanges 6 is less than the distance between the side flanges 2, and the diameter of the cylindrical periphery of each nut is less than the diameter of the holes 3 so that the nuts have a limited lateral movement relatively to the channel member. In this manner any small error in aligning the nuts with the structural part 14 to which the fastening strip is secured may be compensated for. The holes 8 in the base of the fastening strip are circular and of a diameter equal to that of the holes 3 so that co-operating bolts 16, extending through the structural parts 14 and 15 to secure the same together, may be screwed into the nuts for any position of the nuts allowed by the limited lateral movement thereof.

The fastening strip may be secured to a structural part in any suitable manner, for example, by spot-welding or by riveting. In the form illustrated in the drawing the nuts extend only through alternate holes 3 in the web 1, the holes thus left free allowing rivets 17 to be passed through holes 11 in the base portion of the strip whereby it may be secured to the structural part 14.

Since the free edges of the fastening strip occur at the base thereof, it will be seen that it is impossible for a nut to be forced out of the strip when a bolt is being screwed into it. As will be seen from an inspection of Figures 2 and 4 of the drawing, the inwardly turned edge portions 7 of the side flanges 2 are so frictionally gripped between the flange 6 on the nut 4 and the adjacent surface of the structural member 14 as to resist effectively any tendency to spread the side flanges as the result of turning of the nut. It will be noted that in the preferred form of the invention illustrated in the drawing, the inturned edge portions 7 of the side flanges 2 lie in closely contiguous relation, and it is highly desirable that the space between these flanges shall be at least no greater than the cross-sectional dimension of the body portion of the nut 4, the term "body portion" being used to designate that part of the nut which projects through the aperture 3 in the channel member. In Figure 5 of the drawing is shown the forces acting to spread the side flanges of the strip as the bolt is turned down in the nut, and the forces which act to resist such spreading. Thus the nut tends to turn with the bolt, and the corners 20 of the nut will engage the side flanges of the strip, tending to force the latter ouwardly, as indicated by the arrows in Figure 5. However, as the nut becomes tight and the spreading forces become dangerously high, the inturned edges of the side flanges of the strip will be clamped between the opposing faces 18 of the nut flange and 19 of the structural member 14, also as indicated by arrows, and spreading of the side flanges of the strip will thereby be effectively prevented, owing to the friction developed between the engaged surfaces.

The nuts employed in the fastening strip in accordance with this invention may be self-locking and are advantageously made in accordance with Patent No. 1,550,282. A self-locking nut of this kind is illustrated in the drawing and, as shown, comprises an annular inset 9 of vulcanized fibre or other hard elastic material having an internal diameter less than the maximum diameter of the threads of the screw-threaded bore 5 so that the elastic inset is penetrated by the threads of a co-operating bolt when screwed into the nut. Other nuts, which may or may not be self-locking, may, however, be employed.

Although the present invention relates more especially to a fastening strip containing a plurality of nuts, it will be understood that the invention also includes a fastening strip incorporating a single nut.

The expressions "lateral" and "laterally" are used herein to denote directions transverse to the axis of the nut.

I claim:

1. A nut-containing fastening strip comprising a channel member having a web and side flanges, a nut having a screw-threaded bore, said nut comprising a body portion and a laterally enlarged base portion, said base portion being housed within said channel member, the web of the channel member being provided with an aperture into which the body portion of the nut extends, the cross-sectional dimensions of the body portion of the nut being so correlated with the cross-sectional dimensions of the said aperture and the dimensions of the said laterally enlarged base portion of the nut being so correlated with the distance between the side flanges of the channel member that the nut has a limited lateral movement relative to the channel member, the laterally enlarged base portion of the nut being adapted to engage the side flanges of the channel member to prevent relative rotary movement between the nut and channel member and to engage the said web to prevent the nut from passing completely through the aperture in the web, the side flanges of the channel member having inwardly-turned edge portions forming a base to the channel member to secure the nut to the channel member against removal, the space between said inwardly-turned edge portions being substantially less than the cross-sectional dimension of the body portion of the nut, the said base of the channel member having a bolt-receiving aperture of such size as to register with the bore of the nut for various positions thereof allowed by the limited lateral movement of the nut, said base of the channel member extending laterally beyond the nut to an extent sufficient to permit the fastening strip to be secured to a structural part so as to lie wholly on one side thereof.

2. A nut-containing fastening strip comprising a channel member having a web and side flanges, a nut having a screw-threaded bore, said nut comprising a body portion and a laterally enlarged base portion, said base portion being housed within said channel member, the web of the channel member being provided with an aperture into which the body portion of the nut extends, the cross-sectional dimensions of the body portion of the nut being so correlated with the cross-sectional dimensions of the said aperture and the dimensions of the said laterally enlarged base portion of the nut being so correlated with the distance between the side flanges of the channel member that the nut has a limited lateral movement relative to the channel member, the laterally enlarged base portion of the nut being adapted to engage the side flanges of the channel member to prevent relative rotary movement between the nut and channel member and to engage the said web to prevent the nut from passing completely through the aperture in the web, the side flanges of the channel member having inwardly-turned edge portions extending into contiguous relation to form a base to the channel member to secure the nut to the channel member against removal, the said base of the channel member having a bolt-receiving aperture of such size as to register with the bore of the nut for various positions thereof allowed by the limited lateral movement of the nut, said base of the channel member extending laterally beyond the nut to an extent sufficient to permit the fastening strip to be secured to a structural part so as to lie wholly on one side thereof.

3. In devices for securing structural members together, the combination with a nut-containing fastening strip comprising a channel member having a web and side flanges, of a nut having a screw-threaded bore, said nut comprising a body portion and a laterally enlarged base portion, said base portion being housed within said channel member, the web of the channel member being provided with an aperture into which the body portion of the nut extends, the cross-sectional dimensions of the body portion of the nut being so correlated with the cross-sectional dimensions of the said aperture and the dimensions of the said laterally enlarged base portion of the nut being so correlated with the distance between the side flanges of the channel member that the nut has a limited lateral movement relative to the channel member, the laterally enlarged base portion of the nut being adapted to engage the side flanges of the channel member to prevent relative rotary movement between the nut and channel member and to engage the said web to prevent the nut from passing completely through the aperture in the web, the side flanges of the channel member having inwardly-turned edge portions forming a base to the channel member to secure the nut to the channel member against removal, the said base of the channel member having a bolt-receiving aperture of such size as to register with the bore of the nut for various positions thereof allowed by the limited lateral movement of the nut, and a threaded bolt for insertion, in the order named, through a plurality of structural members, the base of the channel member, and the threaded bore of the nut, whereby the base of the channel member may be frictionally gripped between the base portion of the nut and the adjacent structural member to resist spreading of the channel member by rotation of the nut.

4. In devices for securing structural members together, the combination with a nut-containing fastening strip comprising a channel member having a web and side flanges, of a nut having a screw-threaded bore, said nut comprising a body portion and a laterally enlarged base portion, said base portion being housed within said channel member, the web of the channel member being provided with an aperture into which the body portion of the nut extends, the laterally enlarged base portion of the nut being adapted to engage the side flanges of the channel member to prevent relative rotary movement between the nut and channel member and to engage the said web to prevent the nut from passing completely through the aperture in the web, the side flanges of the channel member having inwardly-turned edge portions forming a base to the channel member to secure the nut to the channel member against removal, the said base of the channel member having a bolt-receiving aperture of such size as to register with the bore of the nut and a threaded bolt for insertion, in the order named, through a plurality of structural members, the base of the channel member, and the threaded bore of the nut, whereby the base of the channel member may be frictionally gripped between the base portion of the nut and the adjacent structural member to resist spreading of the channel member by rotation of the nut.

JACK VICTOR DYER.